(12) United States Patent
Estrach et al.

(10) Patent No.: US 8,571,114 B2
(45) Date of Patent: Oct. 29, 2013

(54) SPARSE GEOMETRY FOR SUPER RESOLUTION VIDEO PROCESSING

(75) Inventors: Joan Bruna Estrach, Paris (FR); Mark Alexander Shand, Dampierre en Yvelines (FR)

(73) Assignee: Zoran (France) S.A., Neuilly-sur-Seine (FR)

( * ) Notice: Subject to any disclaimer, the term of this patent is extended or adjusted under 35 U.S.C. 154(b) by 495 days.

(21) Appl. No.: 12/812,201

(22) PCT Filed: Jan. 11, 2008

(86) PCT No.: PCT/IB2008/051270
§ 371 (c)(1),
(2), (4) Date: Nov. 22, 2010

(87) PCT Pub. No.: WO2009/087493
PCT Pub. Date: Jul. 16, 2009

(65) Prior Publication Data
US 2011/0058106 A1    Mar. 10, 2011

(51) Int. Cl.
*H04N 7/12* (2006.01)

(52) U.S. Cl.
USPC .................................................. 375/240.26

(58) Field of Classification Search
CPC ........................................................ H04N 5/14
USPC ........................................................... 348/699
IPC ............................................................ H04N 5/14
See application file for complete search history.

(56) References Cited

U.S. PATENT DOCUMENTS 5,428,398 A    6/1995  Faroudja
5,742,710 A    4/1998  Hsu et al.

(Continued)

FOREIGN PATENT DOCUMENTS

GB    21888510 A    9/1987
WO     9746022 A   12/1997

(Continued)

OTHER PUBLICATIONS

E. Dubois and S. Sabri, "Noise Reduction in Image Sequences Using Motion-Compensated Temporal Filtering", IEEE Transactions on Communications, vol. COM 32, No. 7, Jul. 1984, pp. 826-832.

(Continued)

*Primary Examiner* — Y Lee
*Assistant Examiner* — Francis G Geroleo
(74) *Attorney, Agent, or Firm* — Lando & Anastasi, LLP

(57) ABSTRACT

In a method of analyzing an input video sequence, pixels of synthesized images of an output video sequence are associated with respective directions of regularity belonging to a predefined set of directions. A first subset of candidate directions is determined from the predefined set of directions for a region of a first image of the output sequence. For a corresponding region of a second synthesized image of the output sequence following the first image, a second subset of candidate directions is determined from the predefined set of directions, based on images of the input sequence and the first subset of candidate directions. The directions of regularity for pixels of this region of the second synthesized image are detected from the second subset of candidate directions. The recursive determination of the subsets of candidate directions provides a sparse geometry for efficiently analyzing the video sequence. The method is well suited for super-resolution video applications such as deinterlacing, frame rate conversion and noise reduction.

22 Claims, 11 Drawing Sheets

(56) References Cited

U.S. PATENT DOCUMENTS

| | | | |
|---|---|---|---|
| 6,278,736 B1* | 8/2001 | De Haan et al. | 375/240.16 |
| 6,845,130 B1* | 1/2005 | Han et al. | 375/240.16 |
| 6,940,557 B2 | 9/2005 | Handjojo et al. | |
| 7,110,453 B1* | 9/2006 | Wilinski et al. | 375/240.16 |
| 2006/0251172 A1* | 11/2006 | Kim | 375/240.16 |
| 2007/0098279 A1 | 5/2007 | Hahn et al. | |
| 2008/0002051 A1* | 1/2008 | Sato | 375/240.16 |

FOREIGN PATENT DOCUMENTS

| | | |
|---|---|---|
| WO | 9940726 A | 8/1999 |
| WO | 2004064403 A | 7/2004 |
| WO | 2007059795 A1 | 5/2007 |
| WO | 2007115583 A1 | 10/2007 |

OTHER PUBLICATIONS

G. De Haan et al., "True-Motion Estimation with 3D Recursive Search Block Matching", IEEE Transactions on Circuits and Systems for Video Technology, vol. 3, No. 5, Oct. 1993, pp. 368-379.

Xu et al., "Three-Dimensional Embedded Subband Coding with Optimized Truncation (3D-ESCOT)", Applied and Computational Harmonic Analysis, vol. 10, 2001, pp. 290-315.

International Search Report in corresponding International Application No. PCT/IB2008/051270 dated, Jul. 10, 2008.

Yen-Kuang Chen et al., "A Feature Tracking Algorithm Using Neighborhood Relaxation with Multi-Candidate Pre-Screening", Proceedings of the International Conference on Image Processing (ICIP), Lausanne, Sep. 16-19, 1996, Proceedings of the International Conference on Image Processing (ICIP), New York, IEEE, US, vol. 1, Sep. 16, 1996, pp. 513-516.

Seongsoo Lee et al., "Two-Step Motion Estimation Algorithm Using Low-Resolution Quantization", School of Electrical Engineering, Seoul, Korea, pp. 795-798.

J. Bergen et al., "Hierarchical Model-Based Motion Estimation", European Conference on Computer Vision, 1992, pp. 237-252.

Gerard De Haan et al., "Sub-Pixel Motion Estimation with 3-D Recursive Search Block-Matching", Signal Processing Image Communication, 1994, pp. 229-239.

H. Richter et al., "Real Time Global Motion Estimation for an MPEG-4 Video Encoder", University of Rostock, Institute of Communications and Information Electronics, Picture Coding Symposium, Apr. 2001, Seoul, Korea, pp. 1-4.

John Y.A. Wang et al., "Representing Moving Images with Layers", IEEE Transactions on Image Processing Special Issue, vol. 3, No. 5, Sep. 1994, pp. 625-638.

* cited by examiner

SPARSE GEOMETRY FOR SUPER RESOLUTION VIDEO PROCESSING

BACKGROUND OF THE INVENTION

The present invention relates to digital video processing. It is applicable, in particular, in the field of super-resolution video processing. Super-resolution video processing methods are used in various applications including super-resolution interpolation (such as frame-rate conversion, super-resolution video scaling and deinterlacing) and reduction of compression artifacts and/or noise.

In digital systems, a video sequence is typically represented as an array of pixel values $I_t(x)$ where t is an integer time index, and x is a 2-dimensional integer index $(x_1, x_2)$ representing the position of a pixel in the image. The pixel values can for example be single numbers (e.g. gray scale values), or triplets representing color coordinates in a color space (such as RGB, YUV, YCbCr, etc.).

Super-resolution video processing methods consist in computing new pixel values (for interpolation) or new values of existing pixels (for noise reduction) by combining pixel values of several adjacent video frames in time.

WO 2007/115583 A1 discloses a super-resolution video processing method which exhibits very few artifacts. The method consists in selecting for each new pixel to be calculated an interpolator best suited for computing that pixel. For certain particular sequences, however, it may be necessary to enhance the method by increasing the total number of interpolators considered. The quality is increased but at the cost of a higher complexity.

In video interpolation applications, known techniques are motion adaptive or motion compensated.

Motion-adaptive video deinterlacing only provides full resolution deinterlaced frames when the video is not moving. Otherwise, the deinterlaced frames exhibit jagged contours or lower resolution textures, and flicker. An example of an advanced motion adaptive technique is described in U.S. Pat. No. 5,428,398.

Motion-compensated techniques are known to reach better quality levels, at the expense of being less robust and displaying in some cases substantially worse artifacts than motion-adaptive techniques. This happens in particular at locations of the video where motion estimation does not work well, like occlusions, transparent objects, or shadows. An example of a motion-compensated deinterlacing technique is described in U.S. Pat. No. 6,940,557.

A standard way to perform frame-rate conversion includes estimating motion estimation between two frames to compute a dense motion field, and computing new frames with motion-compensated interpolation. For the same reasons as above, frame-rate conversion based on such steps has a number of drawbacks. Dense motion estimation fails on periodic patterns, on contours or on flat areas.

A popular technique for motion estimation is referred to as "block matching". In the block matching technique, estimating the motion at x and t consists in minimizing a matching energy $E_x(v)$ over a window W which is a set of offsets $d=(d_1, d_2)$. A possible form of the matching energy ($L_1$-energy) is $$E_x(v) = \sum_{d \in W} |I_t(x+d) - I_{t+1}(x+d+v)|.$$

Another form frequently used is the $L_2$-energy or Euclidean distance:

$$E_x(v) = \sum_{d \in W} |I_t(x+d) - I_{t+1}(x+d+v)|^2.$$

Block matching is well suited for motion compensation in video compression schemes such as MPEG, which make use of block-based transforms. If the matching algorithm matches two windows of images that are similar, but do not represent the same object (e.g. matching the first 'e' with the second 'e' in an image of the word "sweet"), compression efficiency is not impaired. However, when doing video interpolation, matching groups of pixels which do not actually correspond to the same object leads to interpolation artifacts, because the interpolated pixels will reflect an "incorrect motion" due to spatial correlation in the objects appearing in the images.

Block matching methods are computationally intensive, in proportion to the number of possible displacements that are actually considered for each pixel. In video compression again, "fast" block matching strategies consist in limiting the range of possible displacements using predetermined motion subsets. This is not acceptable in video interpolation where using a displacement vector that is too inaccurate leads to blurry interpolated images or to artifacts.

To circumvent these problems in motion estimation, several methods have been developed. A first set of methods impose a smoothness constraint on the motion field, i.e. by imposing that for pixels that close one to another, the corresponding motion vectors are close. This can be achieved with multiscale motion estimation, or recursive block matching. Another type of method designed to solve this issue is phase correlation.

U.S. Pat. No. 5,742,710 discloses an approach based on multiscale block-matching. In the 2-scale case, block matching is performed between copies of $I_t$ and $I_{t+1}$ that have been reduced in size by a factor of 2 in each dimension (i.e. four times less pixels) and the resulting displacement map is then refined to obtain a resolution twice finer. The refinement process is a search of limited range around the coarse scale results. As a result, the cost of the displacement search is reduced because full range searches are done only on smaller images. The resulting displacement field is also smoother because it is a refinement of a low resolution map. However, the motion in a scene cannot be accurately accounted for by a smooth displacement map: the motion field is inherently discontinuous, in particular around object occlusions. Enforcing a displacement map smoothness constraint is not an appropriate way to address the robustness issue.

Another method to handle in a similar way this problem is recursive block matching as disclosed in "True-Motion with 3D Recursive Search Block Matching", G. De Haan et al., IEEE Transactions on Circuits and Systems for Video Technology, Vol. 3, No. 5, October 1993, pp. 368-379. This method significantly reduces the cost of computing a motion map, but it can still be misled by periodic patterns or even occlusions.

GB-A-2 188 510 discloses a so-called phase correlation method in which a displacement energy map is computed over a large image window for a set of candidate displacements. This map can be computed efficiently using fast Fourier transform. A subset of displacements corresponding to peak values in the energy map is determined as including the most representative displacements over this window. Then block matching is performed as a second step pixelwise considering only this subset of displacements.

This method reduces the complexity of motion estimation, and is also able to detect discontinuous motion maps. With the phase correlation technique, the motion map is also regularized and constrained, but in a way very different from spatial regularization. Instead of imposing a local smoothness of the motion map, phase correlation limits to a fixed number the set of different possible vectors in a motion map.

However, phase correlation still requires relatively complex computations based on 2-dimensional fast Fourier transforms that are expensive to implement in hardware. Also, the method selects motion vectors on the basis of individual merit that is assessed with their phase correlation. So it has a limited ability to provide a minimal set of motion vectors. Indeed, when a moving pattern has a periodic structure or is translation-invariant, several vectors have comparable merit values, and phase correlation is not able to arbitrate between them. The resulting motion-compensated video interpolation process is thus of suboptimal robustness. This has also a cost in terms of complexity because for all pixels, more candidate motion vectors are considered than necessary.

Other classes of approaches include selecting a first subset of displacements by computing low-complexity matching energies on candidate vectors. This can reduce the computational complexity to some extent, but it is not an appropriate way to make the motion-compensated interpolation more reliable.

Classical and still popular methods for noise reduction in video sequences include motion-compensated recursive or non-recursive temporal filtering. See, e.g., "Noise reduction in Image Sequences Using Motion-Compensated Temporal Filtering", E. Dubois and S. Sabri, IEEE Transactions on Communications, Vol. COM-32, No. 7, July 1984, pp. 826-832. This consists in estimating motion between a frame and a preceding frame, and filtering the video sequence along the estimated motion with a temporal filter.

Other known methods use motion-compensated 3D wavelet transforms. See "Three-Dimensional Embedded Subband Coding with Optimized Truncation (3D-ESCOT)", Xu, et al., Applied and Computational Harmonic Analysis, Vol. 10, 2001, pp. 290-315. The motion-compensated 3D wavelet transform described in this paper can be used for noise reduction, by performing a wavelet thresholding on this 3D transform. The limitation of such an approach using lifting-based wavelet transform along motion threads is its very high sensitivity to the corruption of the motion map by noise.

WO 2007/059795 A1 describes a super-resolution processing method that can be used for long-range noise reduction or super-resolution scaling. The method is based on a bandlet transform using multiscale grouping of wavelet coefficients. This representation is much more appropriate for noise reduction or super-resolution scaling than the 3D transform described in the 3D-ESCOT paper. The multiscale grouping performs a variable range image registration that can be computed for example with block matching or any state of the art image registration process. For both super-resolution scaling and noise reduction, it is important that the image registration map used is not corrupted by noise or by aliasing artifacts.

Whatever the application (interpolation or noise reduction), using a motion-compensated approach with a dense flow field has limitations: aperture, irrelevance of a single motion model for contents with transparent objects or shadows. Analyzing the local invariance structure of video by detecting at each pixel one or more directions of regularity of the video signal in space and time, as described in WO 2007/115583 A1 provides a more general and robust way to do video interpolation. There is thus a need for a technique which makes it possible to detect such directions in an efficient way and with enhanced robustness.

An object of the present invention is to propose a method useful for detecting directions of regularity in an input video stream with high accuracy and high robustness. In particular, in super-resolution video interpolation, it is desired to avoid artifacts usually caused by incoherent interpolation directions. In video noise reduction, it is desired to select averaging directions that are not corrupted by noise.

Another object is to reduce substantially the implementation complexity of the super-resolution interpolation or noise reduction processing.

SUMMARY OF THE INVENTION

A method of analyzing an input video sequence is disclosed in which pixels of synthesized images of an output video sequence are associated with respective directions of regularity belonging to a predefined set of directions. The method comprises: determining, from the predefined set of directions, a first subset of candidate directions for a region of a first image of the output sequence; determining, from the predefined set of directions, a second subset of candidate directions for a corresponding region of a second synthesized image of the sequence following the first image, based on images of the input sequence and the first subset of candidate directions; and detecting the directions of regularity for pixels of said region of the second synthesized image from the second subset of candidate directions.

The subset of candidate directions is determined in a time recursion by taking into account the subset determined at a preceding time. Typically, directions will be added to or removed from the subset depending on incremental changes of a cost function caused by such addition or removal. The image "regions" can encompass the whole image area, or only part of it, as discussed further below.

The determination of the second subset of candidate directions may comprise: detecting at least one pair of directions $v_r$ and $v_a$ such that $v_r$ belongs to the first subset of candidate directions, $v_a$ belongs to the predefined set of directions but not to the first subset, and a cost function associated with the first subset with respect to the first and second images is higher than the cost function associated with a modified subset including $v_a$ and the directions of the first subset except $v_r$; and in response to the detection, excluding $v_r$ from the second subset and including $v_a$ into the second subset.

The technique can use simple operations and structures to accelerate the detection of the directions of regularity, or reduce its implementation cost. It reduces the number of artifacts occurring in motion-compensated video interpolation.

A feature of some embodiments consists in evaluating the relative marginal gain that a new direction provides to an existing subset of directions. In contrast, most existing methods in the specific field of motion estimation only use an absolute efficiency measure of a displacement vector, without taking into account which displacements are already used. The present approach selects sparser direction sets, and also manages to put aside various artifacts.

For example, the known phase correlation method consists in finding inside a region of the image the best displacements according to a global phase correlation measure. Within a certain image region, all candidate displacements $V_i$ have an associated phase correlation value which can be noted $P(V_i)$, for i=1, ..., n. An optimal subset will then consist of displacements with the highest phase correlation values. This can be compared to selecting the subset of m directions $(V_i)_{i \in S}$ such that $$\sum_{i \in S} P(V_i)$$

is maximal. The functional $$\sum_{i \in S} P(V_i)$$

on the directions subset is separable, i.e. it can be written as a sum of functionals applied to each direction individually. This choice is commonly made because this is the only case where directly minimizing the functional does not lead to a combinatorial explosion. To find the optimal subset S from the point of view of phase correlation, the m directions for which the functional P takes the highest value are simply picked in that order.

If, however, the functional is not separable and can only be written as $P(\{V_i\}_{i \in S})$, the minimization cannot be done using such a simple algorithm. Finding the best subset of candidates directly is of high combinatorial complexity. In some cases, however, what can still be done is computing variations of the functional when a vector or direction is added to or removed from the selected subset, i.e. $P(\{V_i\}_{i \in S}) - P(\{V_i\}_{i \in S'})$ where S and S' only differ by one element. This then opens the way to incremental optimization of the functional in a time-recursive way.

Hence, in certain embodiments, the determination of the second subset of candidate directions includes: evaluating first margins relating to respective contributions of the individual directions of the first subset to a cost function associated with the first subset; evaluating second margins relating to respective decrements of the cost function resulting from the addition of individual directions of the predefined set to the first subset; and substituting a direction of the predefined set for a direction of the first subset when the second margin evaluated for said direction of the predefined set exceeds the first margin evaluated for said direction of the first subset. It is noted that a global cost function is minimized, whereas techniques such as phase correlation maximize a global correlation measure.

The super-resolution processing of the video sequence may be interpolation or noise reduction. Simple noise reduction is also possible.

The input video sequence $I_t(x)$ is defined on a grid of points $(x, t)$ called "original pixels". The output video sequence $\hat{I}_\tau(\xi)$ is defined on a grid of points $(\xi, \tau)$ called "target pixels". A pixel is defined by a position $(x, t)$ or $(\xi, \tau)$ and the value $I_t(x)$ or $\hat{I}_\tau(\xi)$ of the video image at that location, called a "pixel value".

In the particular case of video interpolation, some target pixels $\hat{I}_\tau(\xi)$ spread over space and/or time may also be original pixels $I_t(x)$ ($\tau=t$, $\xi=x$) and do not need to be recomputed since we can take $\hat{I}_\tau(\xi)=I_t(x)$. The pixels for which a value has to be computed are the target pixels $\hat{I}_\tau(\xi)$ that are not original pixels $I_t(x)$, which are coined "new pixels" ($\tau \neq t$ or $\xi \neq x$).

In the case of video deinterlacing, the frame rate is usually the same in the input and output video sequences, so that the time indexes $\tau$ in the output sequence can be the same as those t in the input sequence; they will generally be denoted by integer indexes t, t+1, etc. The video deinterlacing process consists in adding interpolated missing lines into the successive frames of the input sequence. Typically, the odd frames of the input sequence only have odd lines while the even frames only have even lines, i.e. for $x=(x_1, x_2)$, the input video sequence provides $I_t(x)$ only if t and $x_2$ are both odd or both even. The synthesized frames $\hat{I}_t$ of the output deinterlaced video sequence are made of pixels $\hat{I}_t(\xi)$ with $\xi=(x_1, x_2)$ and without any parity constraint on the integer lines indexes $x_2$, such that $\hat{I}_t(\xi)=I_t(\xi)$ if t and $x_2$ are both odd or both even. The object of video deinterlacing is to interpolate the "best" values for $\hat{I}_t(\xi)=\hat{I}_t(x_1, x_2)$ where one of t and $x_2$ is odd and the other one is even. In order to perform such interpolation, it is useful to detect inter-frame and/or intra-frame directions of regularity.

In the case of frame rate conversion, the time indexes t, $\tau$ are not the same in the input and output video sequences. Integers t, t+1, etc., can be used to index the frames of the input sequence, and then some frames $\hat{I}_\tau$ are synthesized for non-integer values of $\tau$. The spatial indexes $\xi=x=(x_1, x_2)$ are often the same in the input and output frames $I_t$, $\hat{I}_\tau$. The frame rate-converted output sequence includes synthesized frames $\hat{I}_\tau$ for non-integer values of $\tau$. Again, in order to synthesize those intervening frames $\hat{I}_\tau$, an interpolation is performed for which it is useful to detect directions of regularity by analyzing the input video sequence. In order to detect the directions of regularity for the pixels of a synthesized output frame $\hat{I}_\tau$, the analysis will involve at least the frames $I_t$ and $I_{t+1}$ of the input sequence located immediately before and immediately after the non-integer time index $\tau$, i.e. t is the integer such that $t < \tau < t+1$.

In the case of video noise reduction, all target pixel values have to be recomputed. According to these conventions, combined super-resolution video scaling and noise reduction are a case of super-resolution noise reduction. For simple noise reduction, the target pixel grid $(\xi, \tau)$ is the same as that $(x, t)$ of the original pixels: $\hat{I}_t(x)=I_t(x)-v_t(x)$, where $v_t(x)$ is a noise component estimate cancelled by the process. For combined super-resolution noise reduction and scaling, the target pixels are defined on a grid $(\xi, \tau)$ different from the original pixel grid $(x, t)$. This grid $(\xi, \tau)$ is usually a finer grid that can be defined as a superset of the original pixel grid $(x, t)$.

Another aspect of the invention relates to a computer program product, comprising instructions to carry out a video analysis method as outlined above when said program product is run in a computer processing unit.

Still another aspect of the invention relates to a video processing method, comprising: receiving successive images of an input video sequence; analyzing the input video sequence by applying a method as outlined above; and generating the output video sequence using the detected directions of regularity.

The step of generating the video sequence may comprise performing interpolation between successive images of the input video sequence using the detected directions of regularity. Such interpolation may consist of video deinterlacing or of converting the frame rate of the input video sequence. In another embodiment, the processing of the video sequence may comprise applying a noise reduction operation to the input video sequence using the detected directions of regularity.

Still another aspect of the invention relates to a video processing apparatus, comprising computing circuitry arranged to analyze or process a video sequence as indicated hereabove.

BRIEF DESCRIPTION THE DRAWINGS

DESCRIPTION OF PREFERRED EMBODIMENTS

Figure 1:
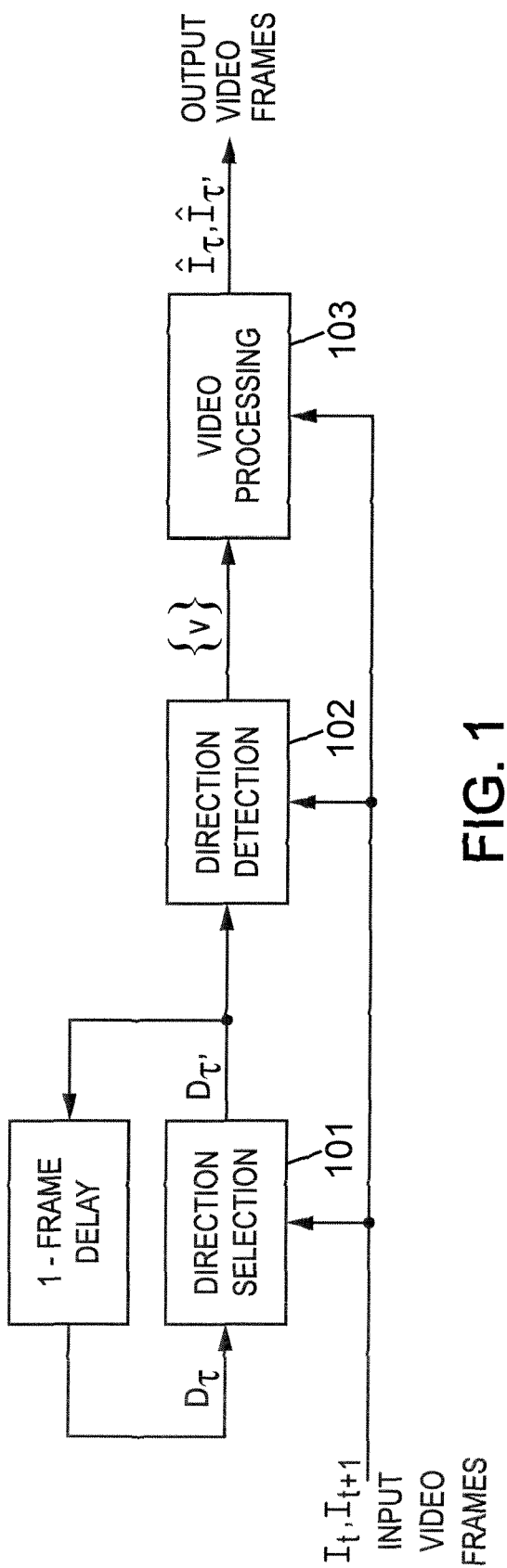
FIG. 1 is a block diagram of an embodiment of a video processing device.

Referring to FIG. 1, a video processing device has an input receiving digital representations of successive images or frames of a video sequence. $I_t$, $I_{t+1}$ denote frames at discrete times t and t+1, and $I_t(x)$, $I_{t+1}(x)$ denote pixel values of those frames for a pixel located by a 2-dimensional index $x=(x_1, x_2)$. How the time indexes t and spatial indexes x are managed may differ from one video processing application to another, e.g. between deinterlacing, frame rate conversion and noise reduction. This issue will be addressed further below.

A direction selection unit 101 implements a time recursive estimation to determine a subset $D_{\tau'}$ of candidate directions for an output frame $\hat{I}_{\tau'}$ based on a previous subset $D_\tau$ and on the consecutive input frames. The aforesaid "previous subset $D_\tau$" was determined for an output frame $\hat{I}_\tau$ which immediately precedes $\hat{I}_{\tau'}$ in the output video sequence. For example $\tau'=\tau+1$ for deinterlacing or simple noise reduction; $t'=\tau+\delta\tau$ for frame rate conversion or super-resolution noise reduction. The input frames involved in the determination of the subset $D_{\tau'}$ at time $\tau'$ include at least $I_t$ and $I_{t+1}$ such that $t \leq \tau' < t+1$. In certain embodiments, they may further include a few past frames $I_{t-1}, \ldots, I_{t-n}$ ($n \geq 1$).

As referred to herein, a "direction" $v=(dx, dt)$ is meant as a direction in the 3D space in which two dimensions relate to pixel offsets $dx=(dx_1, dx_2)$ in the 2D image space and the third direction relates to a time offset dt. There are a number of video applications in which it is desired to look for directions of regularity in an incoming video sequence. When doing video interpolation for example, one must determine the values of certain missing pixels based on "similar" pixels in a neighborhood of the missing pixels. Such a neighborhood can extend in the 2D image space and/or in time, so that it is relevant to look for it in the above-mentioned 3D space. Likewise, in noise reduction applications, the value of an input pixel is corrupted by noise which can be averaged out if it is possible to identify some neighborhood of "similar" pixels. Again, such a neighborhood can extend in the 2D image space and/or in time. The method described below yields directions of regularity for pixels of the images which help determining the "similar" pixel values useful to the processing.

The subset $D_\tau$ or $D_{\tau'}$ is said to define a sparse geometry. Each subset $D_\tau$ or $D_{\tau'}$ is a subset of a set $\Omega$ containing all the possible directions of regularity. The geometry defined by $D_\tau$, $D_{\tau'}$ is said to be sparse because for each instant $\tau$, $\tau'$, the number of different directions that can be used is limited to a relatively small number. As described further below, the subset of candidate directions $D_\tau$, $D_{\tau'}$, ... evolves in time with marginal changes. Directions that would be redundant in $D_\tau$, $D_{\tau'}$ are removed and not used for the pixel-by-pixel processing.

Typically, $\Omega$ can contain 200 to 1000 different directions ($200 \leq |\Omega| \leq 1000$, bars being used to denote the size of a set). The subsets $D_\tau$, $D_{\tau'}$, ... can have their sizes limited in the range $10 \leq |D_\tau| \leq 50$.

A direction detection unit 102 then determines a distribution of directions of regularity $\{v\}$ based on the consecutive frames $I_t$, $I_{t+1}$ (and possibly a few past frames $I_{t-1}, \ldots, I_{t-n}$) by testing only candidate directions belonging to the subset $D_{\tau'}$ determined by the selection unit 101. The reduction in size from $\Omega$ to $D_{\tau'}$ makes it possible to carry out the detection without requiring an exceedingly high complexity.

Finally, the video processing unit 103 uses the detected directions of regularity $\{v\}$ to perform a video processing, such as deinterlacing, frame rate conversion or noise reduction to deliver output video frames from the input frames $I_t$, $I_{t+1}$.

Units unit 102 and unit 103 can implement any conventional or state-of-the-art methods, and simple examples will be given for completeness. In particular, the detection unit 102 can use the loss function described in WO 2007/115583 A1. The core of the invention lies in unit 101 that will be described in greater detail.

As the direction selection unit 101 considers a much larger set of directions than the direction detection unit 102, an interesting possibility is to use a simpler or cost function in unit 101 than in unit 102. In other words, the local cost functions are estimated more coarsely in the step of determining the direction subset $D_{\tau'}$ (selection unit 101) than in the step of picking the directions from that subset (direction detection unit 102). This provides substantial savings in terms of computational complexity or, equivalently, in terms of ASIC/FPGA logic size.

This can be done, for example, by using less precise representations of pixel values, e.g. 5- or 6-bit pixel values in unit 101 instead of 8- to 10-bit pixel values in unit 102. Another possibility is to use in the direction selection unit 101 convolution windows g (to be described further below) that are simpler to compute than those used in the direction detection unit 102, e.g. window profiles corresponding to simple infinite impulse response (IIR) filters which do not require so much logic and memory as large explicit finite impulse response (FIR) filters. Also, cost functions (described below) of different computational complexities can be used for the subset selection in unit 101, and for the pixelwise direction detection in unit 102.

The aim of the selection unit 101 is to compute a subset of directions $D_{\tau'}$ providing a useful description of the local regularity of the video sequence at an instant $\tau'$ in the output sequence. The best subset D is the one that minimizes a global cost (or loss) function L(D):

$$L(D) = \sum_x \min_{v \in D}[L_x(v)] \qquad (1)$$

where the sum over the pixels (x) spans the whole image area (or part of it). The quantity $L_x(v)$ to be minimized over the candidate directions v of D is a local cost (or loss) function, which can be of various kinds for $v=(dx, dt)$, such as:

Absolute difference: $L_x(v)=|I_t(x)-I_{t+dt}(x+dx)|$

Quadratic difference: $L_x(v)=|I_t(x)-I_{t+dt}(x+dx)|^2$

Weighted sum of absolute differences:

$$L_x(v) = \sum_d g(d) \cdot |I_t(x+d) - I_{t+dt}(x+d+dx)|$$

Weighted sum of quadratic differences:

$$L_x(v) = \sum_d g(d) \cdot |I_t(x+d) - I_{t+dt}(x+d+dx)|^2$$

where g is a convolution window function, i.e. with non-zero values in a vicinity of (0,0).

Other variants are possible, including computing local cost functions over more than two frames of the video sequence, e.g. $L_x(v)=|I_t(x)-I_{t+dt}(x+dx)|+|I_t(x)-I_{t-dt}(x-dx)|$, and similar variations.

For convenience, we also define the local cost $L_x(D)$ of a set of directions as the minimum of the loss function over all directions in that set:

$$L_x(D) = \min_{v \in D}[L_x(v)] \quad (2)$$

Note that finding the subset D minimizing (1) is of extreme combinatorial complexity, because the value of adding a direction to the subset D depends on the directions already present in that subset. To overcome this difficulty, an incremental approach is proposed. The minimization is done using time recursion, by applying only marginal changes to $D_\tau$, $D_{\tau'}$, ... in time.

Figure 2:
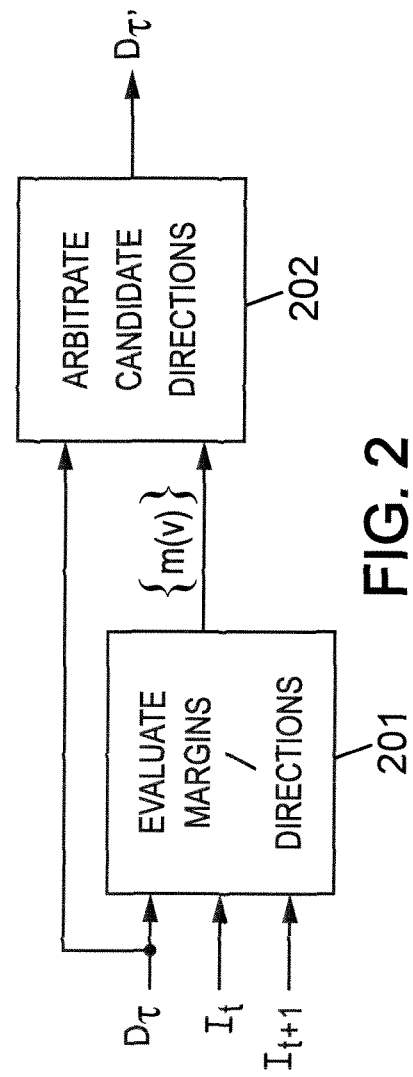
FIG. 2 is a block diagram of an example of direction selection unit usable in the device of FIG. 1.

The direction selection unit 101 as depicted in FIG. 2 has a block 201 for evaluating margins m(v) for different directions v of the set of possible directions Ω, and an arbitration block 202 to decide, based on the margins m(v) which directions of $D_\tau$ should be excluded from $D_{\tau'}$ and which directions of Ω−$D_\tau$ should be included into $D_{\tau'}$. The directions v selected to be added to $D_\tau$ to get $D_{\tau'}$ are chosen depending on how much they would marginally contribute to improving (reducing) the cost function L(D) according to (1). Likewise, the directions v to be removed from $D_\tau$ are chosen depending on how little they marginally contribute to reducing that cost function L(D).

Deciding which elements are in $D_{\tau'}$ cannot be done by evaluating L(D) for the various combinations D which may form $D_{\tau'}$. However, how L(D) varies when a new direction v of Ω−D is added to D can be estimated using the margin, noted m(v|D), of a direction v with respect to an existing direction subset D:

$$m(v|D)=L(D)-L(D+\{v\}) \quad (3)$$

where D+{v} denotes the union of the set D and of the singleton {v}. In other words, m(v|D) is the measure of how much a new direction marginally contributes to lowering the cost function (1) already obtained with a subset of directions D. The margins m(v|D) can be computed using:

$$m(v|D) = \sum_x m_x(v|D) \quad (4)$$

where the local margin $m_x(v|D)$ at location x of v with respect to D is:

$m_x(v|D)=0$ if $L_x(v) \geq L_x(D)$, i.e. when v is not better at minimizing the cost function at pixel position x than the directions already in D;

$m_x(v|D)=L_x(D)-L_x(v)$ else.

Computing a margin $m_x(v|D)$ for a fixed D and for each x and each candidate v in Ω−D can be done by determining the quantities $L_x(D)$ and $L_x(v)$. Then m(v|D) is computed by updating running sums of $m_x(v|D)$.

Let us consider the case of including a new direction $v_a$, and removing an already selected direction $v_r$ from $D_\tau$ to compute $D_{\tau'}$ as $$D_{\tau'}=D_\tau-\{v_r\}+\{v_a\}.$$

The decrease of the global cost (1) caused by such an exchange can be written as an exchange margin $M_{exch}(v_a, v_r)$:

$$M_{exch}(v_a, v_r) = L(D_\tau) - L(D_\tau - \{v_r\} + \{v_a\}) \quad (5)$$
$$= m(v_a | D_\tau) - m(v_r | D_\tau - \{v_r\} + \{v_a\})$$

If $M_{exch}(v_a, v_r)>0$, namely $m(v_a|D_\tau)>m(v_r|D_\tau-\{v_r\}+\{v_a\})$, substituting direction $v_a$ for direction $v_r$ in $D_\tau$ reduces the global cost so that it is worth swapping $v_r$ and $v_a$. Computing these various margins is tractable, but it is still possible to significantly reduce the amount of computation. This can be understood as follows: "if $v_a$ provides a larger marginal decrease of the global cost than $v_r$ was providing, it is reasonable to do the exchange". In such an approach, instead of computing the exact margins $m(v_r|D_\tau-\{v_r\}+\{v_a\})$ in (5), some approximations can be made.

In a first approximation, $m(v_r|D_\tau-\{v_r\}+\{v_a\})$ is replaced by $m(v_r|D_\tau-\{v_r\})$. The following inequality is always verified:

$$m(v_r|D_\tau-\{v_r\}) \geq m(v_r|D_\tau-\{v_r\}+\{v_a\}) \quad (6)$$

The complexity gain provided by this approximation is significant. The number of margins to be computed is now of order |D| instead of |Ω−D|×|D|. Using this approximation, we can derive a exchange margin $M'_{exch}(v_a, v_r)$ as follows:

$$M'_{exch}(v_a, v_r)=m(v_a|D_\tau)-m(v_r|D_\tau-\{v_r\}) \quad (7)$$

Note that the exchange margin $M'_{exch}(v_a, v_r)$ in (7) is not more than the actual exchange margin $M_{exch}(v_a, v_r)$ in (5). If the approximated exchange margin $M'_{exch}(v_a, v_r)$ is non-negative, the actual exchange margin $M_{exch}(v_a, v_r)$ is also non-negative. So a swap decided based on (7) cannot be a wrong one from the point of view of (5).

Figure 3:
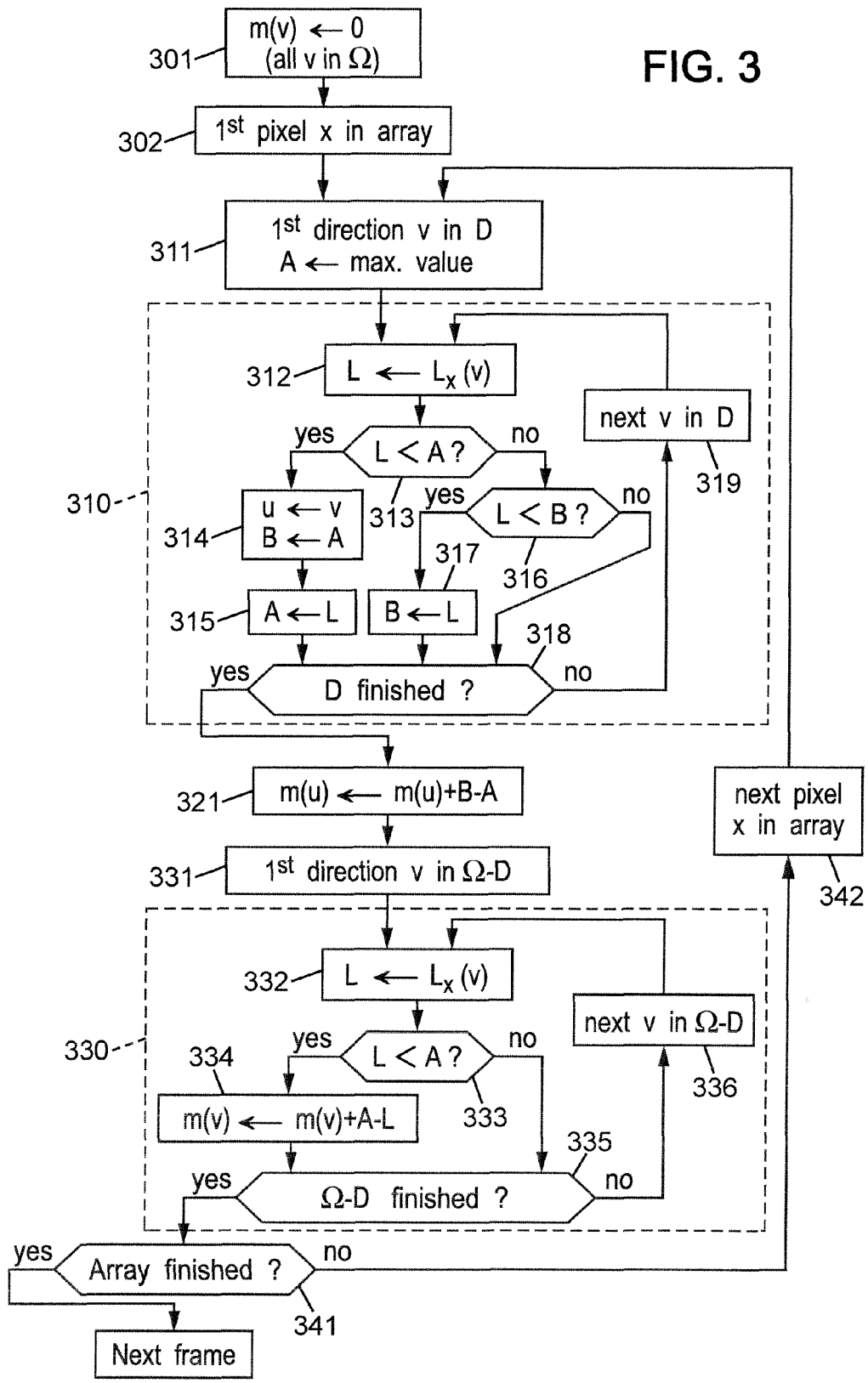
FIG. 3 is a flow chart of an exemplary procedure of evaluating cost function margins in a device as illustrated in FIGS. 1 and 2.

FIG. 3 is a flow chart illustrating a procedure usable by block 201 to evaluate the margins $m(v_a|D_\tau)$ and $m(v_r|D_\tau-\{v_r\})$ used in (7). In FIG. 3, it is assumed that one subset $D_{\tau'}$ of candidate directions is determined for each new input frame $I_{t+1}$ received by the direction selection unit 101. This assumption is valid for video deinterlacing or simple noise reduction (e.g. τ=t, τ'=t+1), or for frame rate doubling (τ=t−½, τ'=t+½). Generalization to frame rate conversion with a ratio other than 2 is straightforward (a procedure of the kind shown in FIG. 3 is generally run for each new output frame to be generated; the above assumption just makes the explanation clearer because it means that the rate of the new output frames is the same as that of the input frames). With this assumption, we can drop the time indexes t−1, t and τ, τ' due to the time recursion in the procedure. In addition, m(v) stands for $m(v_r|D_\tau-\{v_r\})$ if the direction v (=$v_r$) is in D (=$D_\tau$) and may be removed, and for $m(v_a|D_\tau)$ if the direction v (=$v_a$) is in Ω−D and may be added to D. The margins m(v) are evaluated for all directions v in Ω by updating running sums that are set to zero at the initialization 301 of the procedure.

The procedure scans the pixels x of the frame arrays $I_t$ and $I_{t+1}$ one by one, a first pixel x being selected in step 302. A first loop 310 over the directions v of D is executed in order to update the running sums for the directions of D (=$D_τ$) regarding pixel x. This first loop is initialized in step 311 by taking a first direction v in D and setting a variable A to an arbitrarily large value (for example its maximum possible value). At the end of loop 310, variable A will contain the value of $L_x(D)$ defined in (2).

In each iteration of loop 310 (step 312), the local cost $L_x(v)$ for pixel x and direction v is obtained and loaded into variable L. In step 312, block 201 can either compute $L_x(v)$, for example according to one of the above-mentioned possibilities, or retrieve it from a memory if the costs $L_x(v)$ were computed beforehand. A test 313 is performed to evaluate whether L is smaller than A. If L<A, the direction index v is stored in a variable u and a variable B receives the value A in step 314. Then the value L is allocated to the variable A in step 315. At the end of loop 310, variable u will contain the index of the direction v of D which minimizes $L_x(v)$, i.e.

$$u = \underset{v \in D}{\operatorname{argmin}}[L_x(v)],$$

and variable B will contain the second smallest value of $L_x(v)$ for the directions v of D, i.e.

$$B = \min_{v \in D-\{u\}}[L_x(v)].$$

If L≥A in test 313, the local cost is compared to B in test 316. If A≤L<B (yes in test 316), the variable B is updated with the value L in step 317. If L≥B in test 316, or after step 315 or 317, the end-of-loop test 318 is performed to check if all the directions v of D have been scanned. If not, another direction v of D is selected in step 319 and the procedure returns to step 312 for another iteration of loop 310.

When loop 310 is over, the margin m(u) of the direction u of $D_τ$ which minimizes the local cost at pixel x is updated by adding thereto the quantity B−A (step 321). As far as pixel x is concerned, removing u from D would degrade the cost by that quantity while the margins for the other directions of D would remain unaffected.

The processing for pixel x is then continued by a second loop 330 over the possible directions v that are not in D, in order to update the running sums for the directions of Ω−D regarding pixel x.

This second loop is initialized in step 331 by taking a first direction v in Ω−D. In each iteration (step 332), the local cost $L_x(v)$ for pixel x and direction v is computed or retrieved to be loaded into variable L. A test 333 is then performed to evaluate whether L is smaller than A=$L_x(D)$. If L<A, the margin m(v) for direction v is updated by adding thereto the quantity A−L (step 334) in order to take into account the improvement of the cost function that would result from the addition of v into D regarding pixel x. If L≥A in test 333, or after step 334, the end-of-loop test 335 is performed to check if all the directions v of Ω−D have been scanned. If not, another direction v of Ω−D is selected in step 336 and the procedure returns to step 332 for another iteration of loop 330.

When loop 330 is over, it is determined in test 341 if all pixels x of the relevant frame array have been scanned. If not, another pixel x of the array is selected in step 342 and the procedure returns to step 311. The operation of block 201 regarding the current frame is over when test 341 shows that all the pixels have been processed.

For each new input frame $I_{t+1}$, block 201 thus outputs the margins m(v) for all directions v of Ω, i.e. removal margins for the directions of D and addition margins for the directions of Ω−D.

To initialize the procedure at the beginning of an input video sequence, the subset D can have an arbitrary content, or it can be determined with a coarse method over the first few frames. A correct subset will quickly be built due to the time recursion of the selection procedure.

A second approximation can be made to further reduce the complexity of block 201. In this approximation, $m(v_a|D_τ)$ is replaced by a modified margin $m^*(v_a|D_τ)$. As in (4), a modified margin $m^*(v|D)$ is a pixelwise sum:

$$m^*(v \mid D) = \sum_x m_x^*(v \mid D) \tag{8}$$

of local modified margins $m^*_x(v|D)$ defined as:

$m^*_x(v|D)$=$L_x(D)$−$L_x(v)$ if $L_x(v)$<$L_x(Ω-\{v\})$, i.e. when v is the best direction in Ω from the point of view of minimizing the cost function at pixel position x;

$m^*_x(v|D)$=0 else.

With the first and second approximations, a modified exchange margin $M^*_{exch}(v_a, v_r)$ can be derived as follows:

$$M^*_{exch}(v_a, v_r) = m^*(v_a|D_τ) - m(v_r|D_τ-\{v_r\}) \tag{9}$$

Again, the modified exchange margin $M^*_{exch}(v_a, v_r)$ is not more than the actual exchange margin $M_{exch}(v_a, v_r)$, because of (6) and because $m^*_x(v_a|D) \leq m_x(v_a|D)$. So a swap decided based on (9) cannot be a wrong one from the point of view of (5).

The modified margins $m^*_x(v_a|D)$ can be computed with less expensive computations or circuitry because, for each location x, at most one running sum corresponding to a single absolute best direction in Ω−D has to be updated, whereas with non-modified margins $m_x(v_a|D)$, the number of such winners is in the worst case (test 333 always positive in FIG. 3) equal to |Ω−D|. In implementations using hardwired ASIC or FPGA circuits, the impact on logic size is significant. For identical reasons, the impact on the worst-case execution time in a software implementation is also important.

Figure 4:
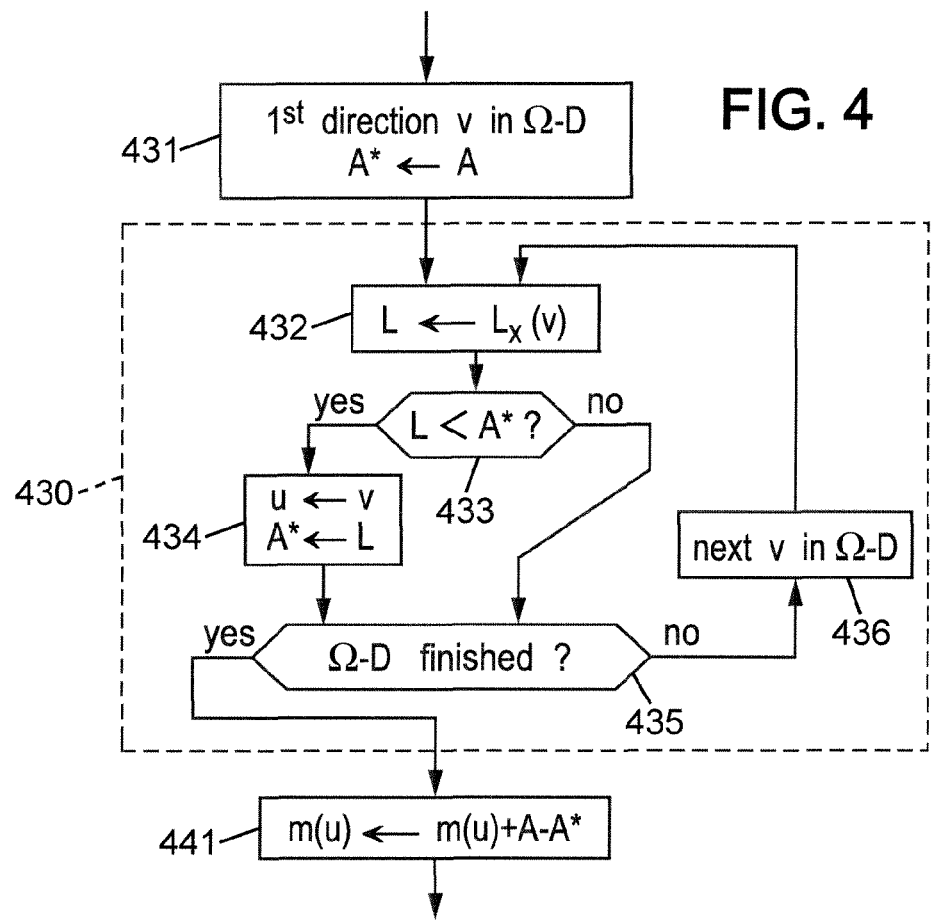
FIG. 4 is a flow chart of an alternative embodiment of a loop used in the procedure of FIG. 3.

With the second approximation, the procedure of FIG. 3 is modified by replacing loop 330 by a modified loop 430 illustrated in FIG. 4. Loop 430 is initialized in step 431 (replacing step 331) by taking a first direction v in Ω−D and setting the value of A=$L_x(D)$ for another variable A*. At the end of loop 430, variable A* will contain the minimum of $L_x(v)$ for all directions v in Ω, i.e. $L_x(Ω)$.

In each iteration, the local cost $L_x(v)$ for pixel x and direction v∈Ω−D is computed or retrieved to be loaded into variable L in step 432. A test 433 is then performed to evaluate whether L is smaller than A*. If L<A*, the above-mentioned variable u is updated to contain the direction index v, and the value L is allocated to the variable A* in step 434. If L≥A* in test 433, or after step 434, the end-of-loop test 435 is performed to check if all the directions v of Ω−D have been scanned. If not, a further direction v of Ω−D is selected in step 436 and the procedure returns to step 432 for another iteration of loop 430.

When loop 430 is over, the margin m(u) of the direction u of Ω which minimizes the local cost at pixel x is updated by adding thereto the quantity A−A* (step 441). If u∈D, step 441 changes nothing. If u∉D, adding u to D would reduce the cost function by A−A* as far as pixel x is concerned, while the margins for the other directions of Ω−D would remain unaffected.

The reduction of complexity results from the fact that the updating step 441 is performed out of the loop 430. The downside of this simplification is some loss of accuracy for the less-than-optimal directions of Ω−D, but this is not such a significant problem in view of the time recursion of the procedure that will eventually reveal the directions actually relevant to the video sequence.

Various procedures can be applied by block 202 to arbitrate between the candidate directions v for which the margins m(v) were computed by block 201.

Figure 5:
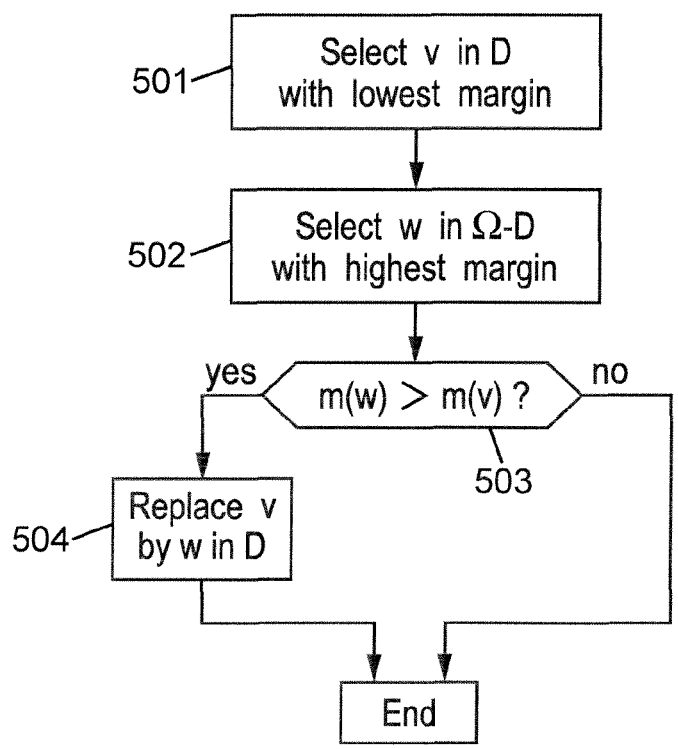
FIGS. 5 and 6 are flow charts of exemplary procedures of arbitrating between candidate directions in a device as illustrated in FIGS. 1 and 2.

In the simple example depicted in FIG. 5, block 202 selects the direction v of the subset $D=D_\tau$ which has the lowest margin m(v) as computed by block 201 and which is thus the best candidate for exclusion from $D_{\tau'}$ (step 501). It also selects the direction w of Ω−D which has the highest margin m(w), i.e. the best candidate for inclusion into $D_{\tau'}$ (step 502). If m(w)>m(v) (test 503), the exchange is done in step 504: v is replaced by w in D so that $D_{\tau'}=D_\tau-\{v\}+\{w\}$. If m(w)≤m(v) in test 503, there is no exchange: $D_{\tau'}=D_\tau$.

Figure 6:
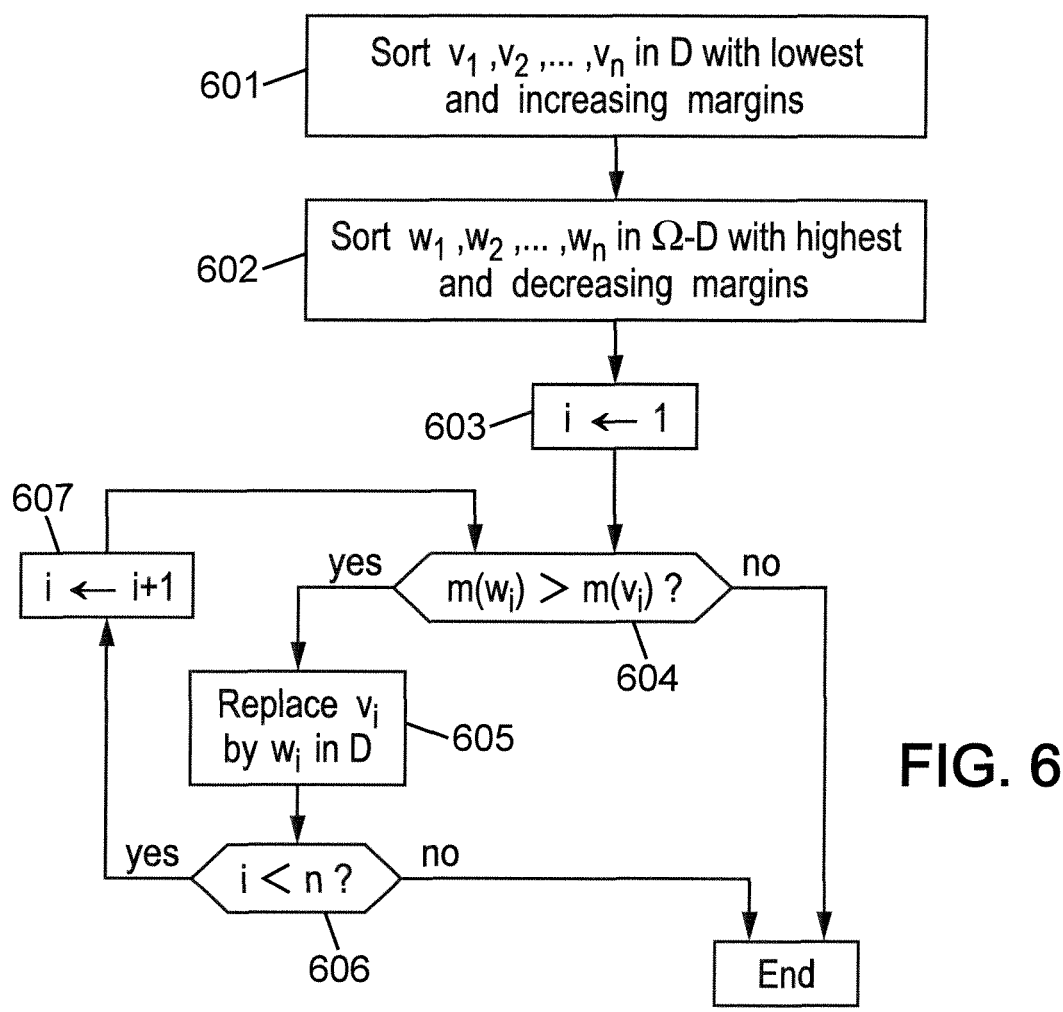

FIG. 6 illustrates another approach in which block 202 can swap more than one pair of directions. In step 601, the n directions $v_1, v_2, \ldots, v_n$ of the subset $D=D_\tau$ which have the lowest margins are selected and sorted with increasing margins: $m(v_1) \leq m(v_2) \leq \ldots \leq m(v_n)$. The number n can be any integer between 1 and |D|. In the case n=1, the procedure of FIG. 6 is the same as that of FIG. 5. In step 602, the direction $w_1, w_2, \ldots, w_n$ of Ω−D which have the highest margins are also selected and sorted with decreasing margins: $m(w_1) \geq m(w_2) \geq \ldots \geq m(w_n)$. Then it is determined how many direction pairs can be swapped. For example, after initializing a loop index i (i=1) in step 603, block 202 compares the margins $m(w_1)$ and $m(v_i)$ in test 604. If direction $w_i$ of Ω−D is better than direction $v_i$ of D, i.e. $m(w_i) > m(v_i)$, the exchange is done in step 605, $w_i$ replacing $v_i$ in D, and then i is compared to n in test 606. If i<n, not all the pairs have been checked and i is incremented in step 607 before checking the next pair in a new test 604. The procedure is terminated when a test 604 reveals that $m(w_i) \leq m(v_i)$ for some i<n, or when i=n in test 606. If n' direction pairs are swapped (n'≤n), the updated direction subset is $D_{\tau'}=D_\tau-\{v_1, \ldots, v_{n'}\}+\{w_1, \ldots, w_{n'}\}$.

In an embodiment, when the directions of regularity are detected by unit 102, only directions v that have a margin m(v) above a given threshold T are used. This is easily done once $D_{\tau'}$ has been determined by block 202, by ignoring in the direction detection unit 102 the directions v of $D_{\tau'}$ such that m(v)<T.

Alternatively, the inclusion of new directions w of $\Omega-D_\tau$ into $D_{\tau'}$ can be prevented when m(w) is below the threshold T. There are various ways of doing this. For example, if the procedure of FIG. 6 is used, the number n can be set as the largest integer in $\{1, 2, \ldots, |D|\}$ such that $m(w_i) > T$ for all indexes i such that 1≤i≤n.

The use of the threshold T helps to prune the set of candidate directions and to select a number of candidate directions that is adapted to the geometric complexity of the video, i.e. to select the sparsest set of directions suitable for the video.

Figure 7:
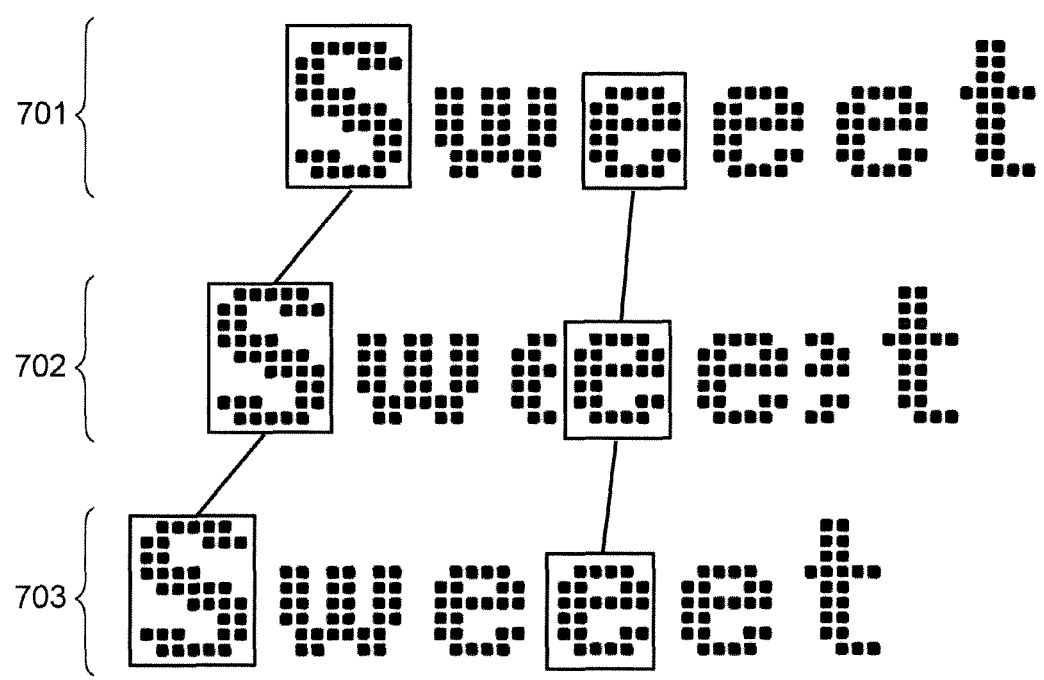
FIGS. 7 and 8 are diagrams illustrating frame rate conversion processing applied to certain image portions.
Figure 8:
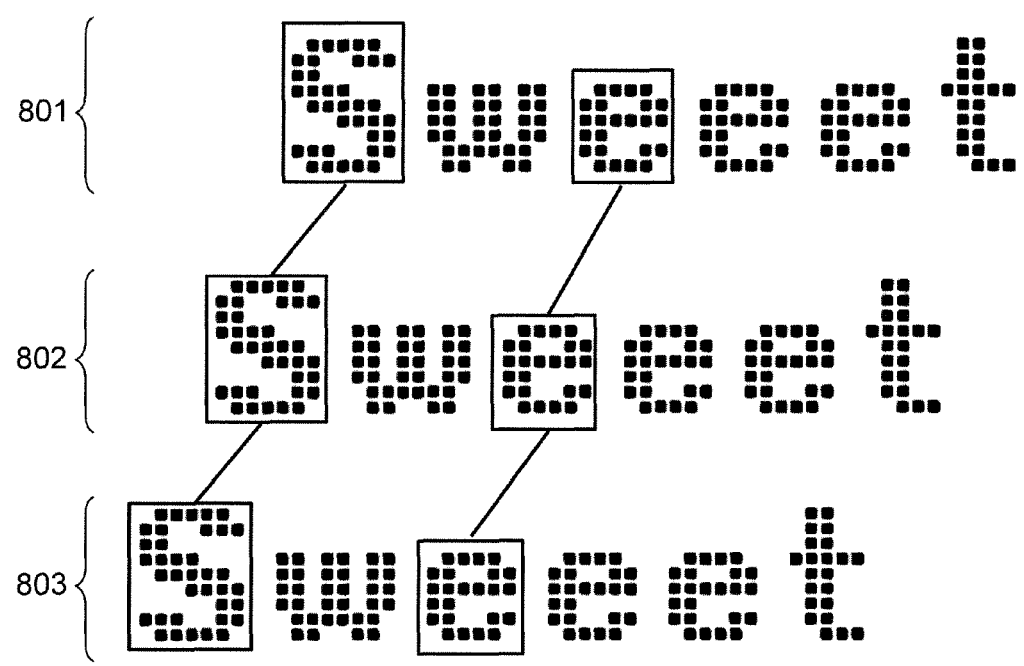

FIGS. 7 and 8 illustrate the results provided by an embodiment of the invention in a case where the video processing unit 103 performs interpolation and more particularly frame rate conversion with a ratio of 2 between the frame rates of the output and input video sequences.

The video sequence in this example is a horizontally scrolling caption with the text "Sweeet". 701 and 801 denote the image at time t, 703 and 803 the image at time t+1 and 702 and 802 the synthesized image at time τ'=t+½, with a mismatch in FIG. 7 and with a correct interpolation in FIG. 8. Between images 701/801 and 703/803 (times t and t+1), the whole text "Sweeet" has scrolled 10 pixels to the left. A possible cause for mismatch is that the text contains several times the letter "e" with a periodicity of 8 pixels, and the direction detection unit 102 might be mistaken by the first "e" at time t looking like another "e" in the next input image at time t+1, leading to artifacts as shown in 702.

In the example of FIGS. 7 and 8, the cost function used in unit 101 is centered, and Ω contains only directions v=(dx, dt) with dt=½. The cost for a direction v=(dx, dt) at location x and time τ'=t+½ is then, for example, $L_x(v) = |I_{\tau'-dt}(x-dx) - I_{\tau'+dt}(x+dx)| = |I_t(x-dx) - I_{t+1}(x+dx)|$ or preferably a windowed version of this cost, by convolution with a non-negative spatial window function g. Two directions of regularity can be found with a local measure on this sequence:

$$v^{(1)} = (dx_1^{(1)}, dx_2^{(1)}, dt^{(1)}) = \left(-5, 0, \frac{1}{2}\right) \text{ and}$$

$$v^{(2)} = (dx_1^{(2)}, dx_2^{(2)}, dt^{(2)}) = \left(-1, 0, \frac{1}{2}\right).$$

Once a direction v=(dx, ½) is detected by unit 102 for a pixel x at time τ'=t+½, the interpolation for frame rate conversion done in unit 103 may consist in computing $\hat{I}_{\tau'}(x) = \hat{I}_{t+1/2}(x) = [I_t(x-dx) + I_{t+1}(x+dx)]/2$.

In FIG. 7, we assume that no sparse geometry is used, so that all directions in Ω are considered in the detection unit 102. For some pixels between the first and the third "e" of the text, the detected direction may group the first "e" at time t with the second "e" at time t+1 (see the squares in FIG. 7) and the second "e" at time t with the third "e" at time t+1, leading to incorrect temporal interpolation. Reference 702 shows an incorrect image with an artifact resulting from this incorrect interpolation. A simple workaround consisting in mixing the interpolated values corresponding to both detected directions $v^{(1)}, v^{(2)}$ does not solve the problem either.

Using a sparse geometry $D_{\tau'}$ in unit 101 helps to overcome this problem. Indeed, if the subset $D_\tau$ does not contain the direction $$v^{(1)} = \left(-5, 0, \frac{1}{2}\right),$$

the margin of $v^{(1)}$ with respect to $D_{\tau'}$ will be high because only $v^{(1)}$ can account for the scrolling of the letters "S", "w" and "t". So $v^{(1)}$ will at some time τ' enter $D_{\tau'}$. This done, since $v^{(1)}$ is a possible direction of the video over all letters including all "e"s, the margin of $$v^{(2)} = \left(-1, 0, \frac{1}{2}\right)$$

will become very low or even zero, because there is no region of the video where it is a possible direction of regularity and $v^{(1)}$ is not. As a result, the direction $v^{(2)}$ will be kept out of the set $D_{\tau'}$ so that it will not be taken into account in the detection unit 102, or will be ignored because its margin is below a threshold T. The correct interpolation will be computed as depicted in 802.

Note that the temporal interpolation can be done at times other than halfway between two original frames. For example, in applications to conversion between the 50 Hz and 60 Hz frame rate standards, interpolation is done at times τ'=t+h/6, where h is one of 1, 2, 3, 4 or 5. The loss function used in units unit 101 and unit 102 can then be adapted accordingly.

FIGS. 9-12 are diagrams similar to FIGS. 7-8 illustrating application of an embodiment of the invention to super-resolution video deinterlacing.

Figure 9:
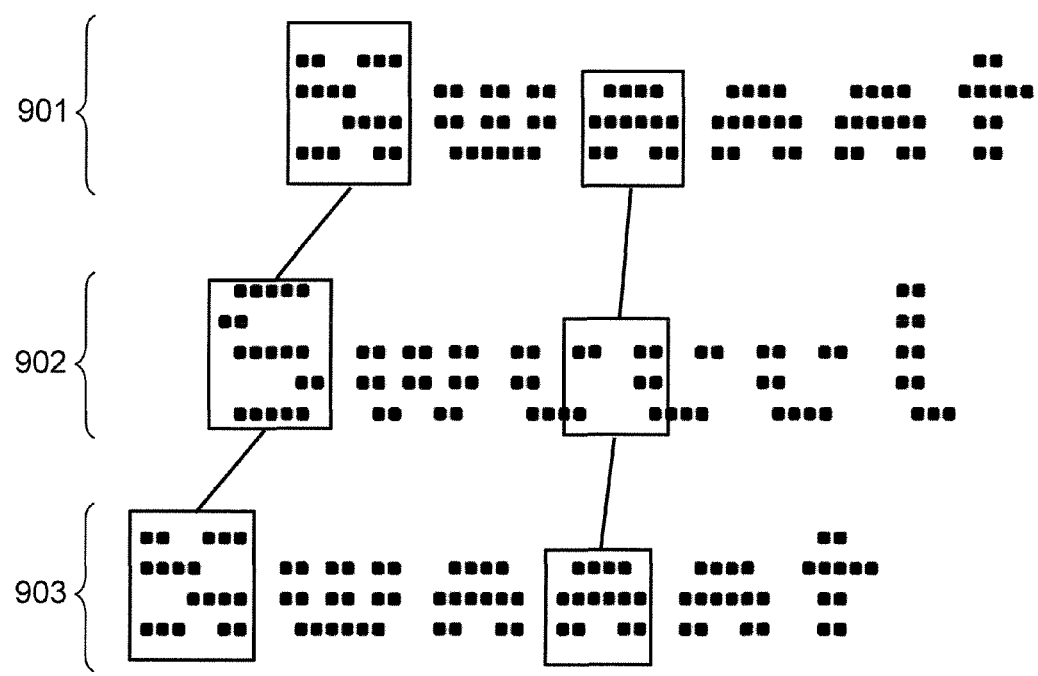
FIGS. 9, 10, 11 and 12 are diagrams illustrating video deinterlacing processing applied to similar image portions.
Figure 10:
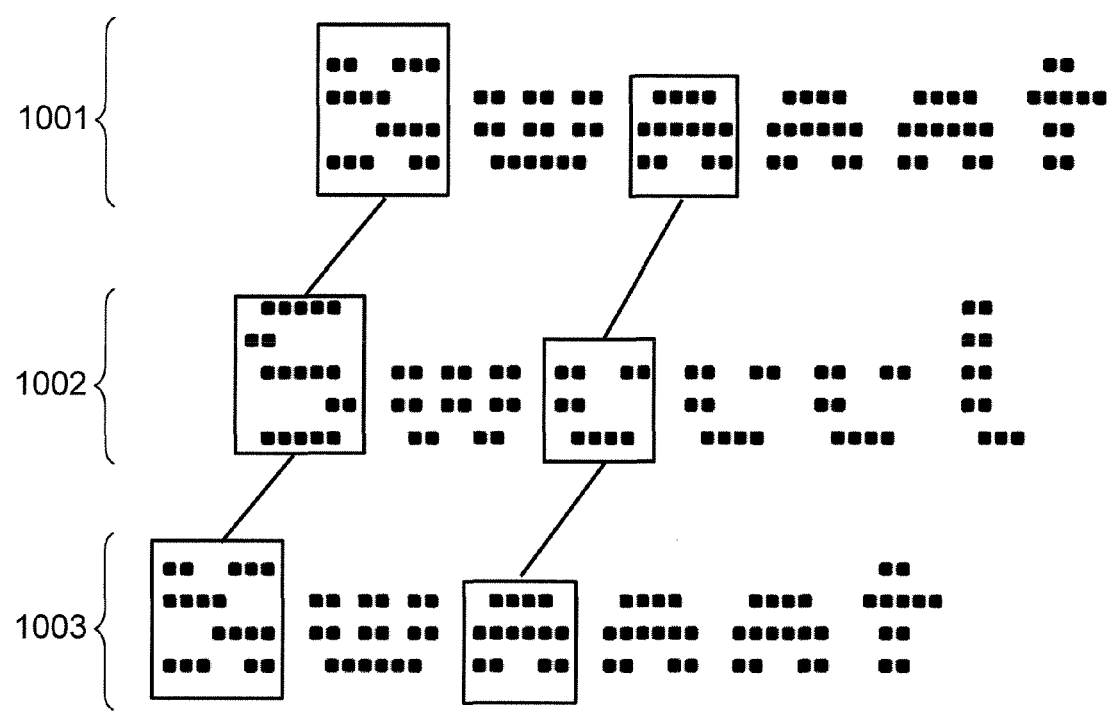
Figure 11:
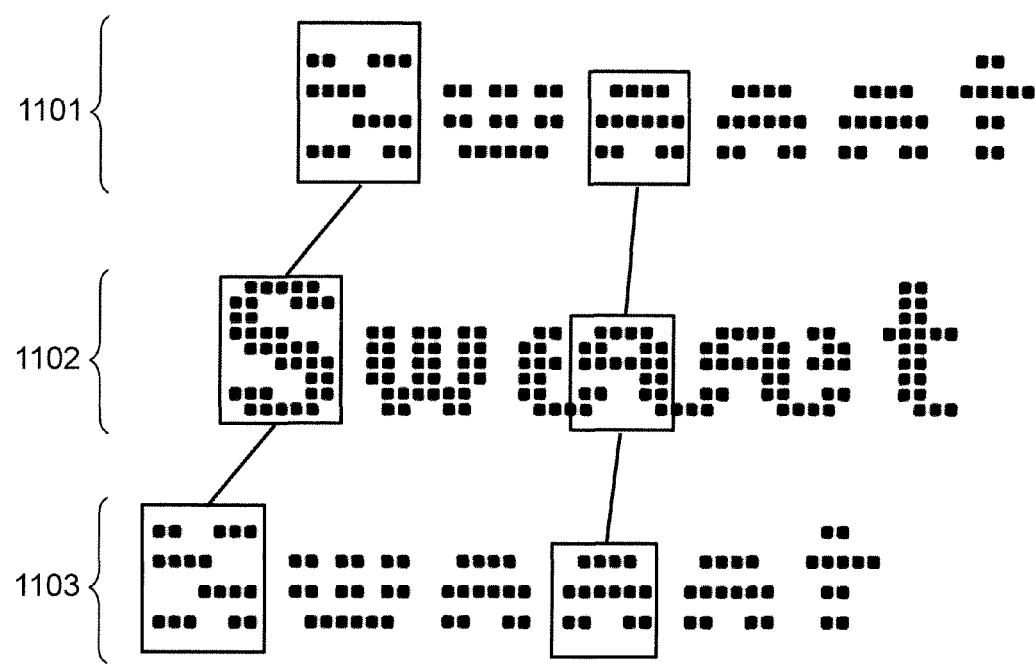

FIGS. 9-10 show the same text "Sweeet" scrolling in an interlaced video format at the input of the apparatus. References 901, 1001, 1101 and 1201 show an even input field at time t−1, references 903, 1003, 1103 and 1203 show the next even input field at time t+1, and references 902 and 1002 show the intervening odd input field at time t. The purpose of deinterlacing is the compute the even lines at time t to synthesize a full progressive frame at time τ'=t containing both even and odd lines.

In the example of FIGS. 9-12, the cost function used in unit 101 is centered, and Ω may contain only directions v=(dx$_1$, dx$_2$, dt) such that dt=1 and dx$_2$ is even. The cost for a direction v=(dx, dt) of Ω at location ξ=x=(x$_1$, x$_2$) and time τ'=t is then, for example, L$_x$(v)=|I$_{t-dt}$(x−dx)−I$_{t+dt}$(x+dx)| or a windowed version of this cost. Several directions of regularity can be found a priori on this sequence, including v$^{(1)}$=(dx$_1$$^{(1)}$, dx$_2$$^{(1)}$, dt$^{(1)}$)=(−5, 0, 1) and v$^{(2)}$=(dx$_1$$^{(2)}$, dx$_2$$^{(2)}$, dt$^{(2)}$)=(−1,0,1).

Once a direction v=(dx, 1) is detected by unit 102 for a pixel x at time τ'=t, the interpolation for deinterlacing done in the processing unit 103 may consist in computing Î$_{τ'}$(ξ)= Î$_t$(x)=[I$_{t−1}$(x−dx)+I$_{t+1}$(x+dx)]/2.

In FIG. 11, we again assume that the selection unit 101 feeds all directions of Ω to the detection unit 102 without using a sparse geometry. The detection unit 102 cannot properly discriminate between directions v$^{(1)}$=(−5,0,1) and v$^{(2)}$=(−1,0,1) and the output can again display dislocation-type of artifacts as shown in 1102.

Figure 12:
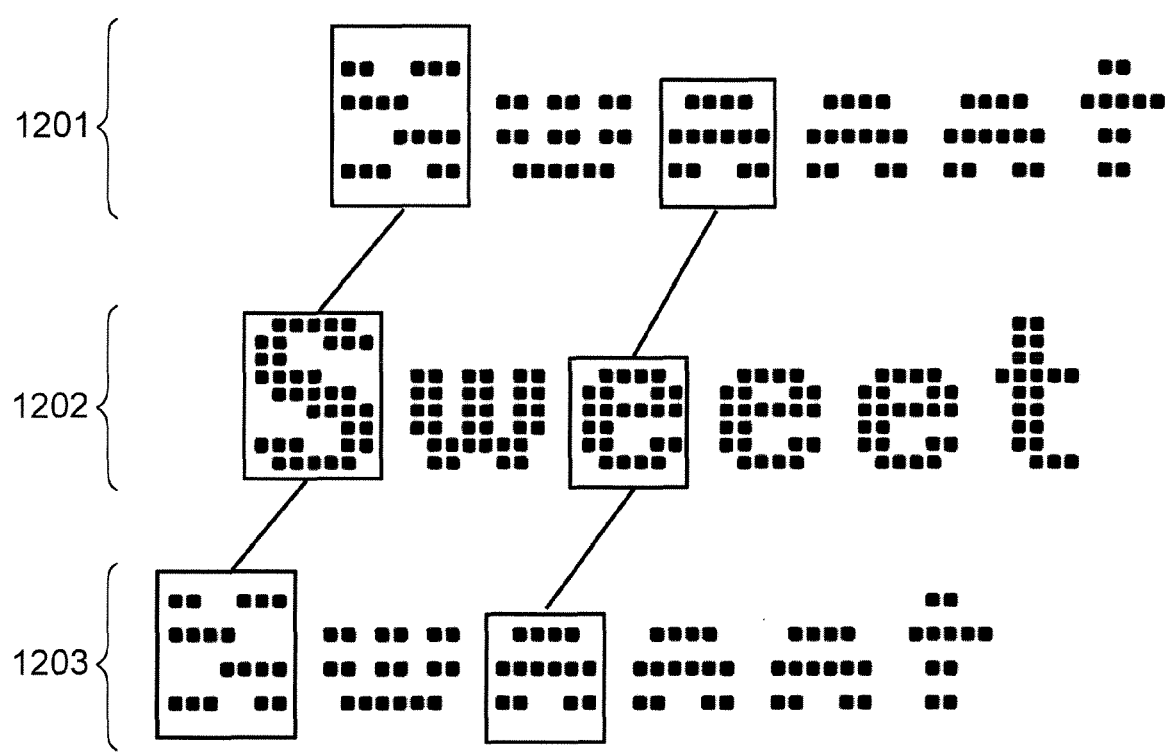

FIG. 12 illustrates the result of a better deinterlacing when only the direction v$^{(1)}$=(−5,0,1) is retained in the sparse geometry by the selection unit 101, the superfluous direction v$^{(2)}$=(−1,0,1) being eliminated in the selection step of the analysis.

Alternatively, in a deinterlacing application, when computing pixels at time τ'=t, a direction can be computed between t−2 and t+2 using the value dt=2 in the directions of 0, in order to account for directions with higher definition. This means that directions v=(dx, 1) and 2v=(2dx, 2) are used in the same way in the interpolation. Because of parity constraints of the interlaced source, corresponding loss functions |I$_{t−2}$(x−2dx)−I$_{t+2}$(x+2dx)| can be computed. If a direction 2v=(2dx, 2dt)= (2dx$_1$, 2dx$_2$, 2dt) is detected by unit 102, the vertical coordinate dx$_2$ of to the half-direction v can be odd. This allows deinterlacing properly video sequences including half-pixel vertical speeds. If such a direction description is referred to in the direction selection and detection units 101-102, the processing unit 103 may interpolate Î$_{τ'}$(ξ) as:

$$Î_{τ'}(ξ)=Î_t(x)=[I_{t−2}(x−2dx)+I_{t+2}(x+2dx)]/2$$

The direction measure that is used can involve time steps of either dt=1 or dt=2. This corresponds to comparing various directions as well as different temporal offsets (1 or 2, or even more).

Another possibility in deinterlacing applications is to compute costs for directions where the fields are shot at irregularly spaced times, in addition to directions associated with fields shot at evenly spaced times. This is for example the case when the original source of the video contents is film converted to video using "telecine". For example, in 2:2 telecine used in Europe, when 25 fps (frames per second) film is transferred to 50 fps video, each film frame is used to generate two video fields, so fields I$_0$, I$_1$, I$_2$, I$_3$ are shot at respective times 0 s, 0 s, 2/50 s, 2/50 s, instead of times 0/50 s, 1/50 s, 2/50 s, 3/50 s for video-originating contents. Furthermore, a video signal can contain a mix of film-originating contents and video-originating contents, so this detection has to be made pixelwise. Specific local cost functions can be chosen for detecting whether for a given pixel, the video is film-originating and whether the field just before or just after originates from the same film frame. A configuration of the direction at each pixel is then one of the following:

(film-before)
(film-after)
(video, v)

where "film-before" means that at a given pixel location, the contents is film-originating, and the preceding field comes from the same film frame, so that missing pixels can be picked at the same location from the preceding field, where "film-after" means that at a given pixel location, the contents is film-originating, and the field after comes from same film frame, and where (video, v) means that at the current pixel location, the contents is video-originating, and the direction vector is v. This description exemplifies another case where the "direction" can be defined by a local descriptor more complex than a single 3D vector v. In this case, the "direction" is a symbol which is one of (film-before), (film-after), (video, v) where v is a vector.

In the case of super-resolution video noise reduction, the processing unit 103 of FIG. 1 computes for each target pixel ξ, τ its new value by using a directional averaging function K$_v$ at ξ with:

$$Î_τ(ξ) = \sum_{x,t} K_v(ξ-x, τ-t) \cdot I_t(x)$$

where the sum runs over all pixels (x, t) of the input images in a vicinity of (ξ, τ), including the pixel (ξ, τ) itself if ξ=x, τ=t for some point (x, t) of the input grid, and K$_v$ depends on the local direction v=(dx,dt). In an exemplary embodiment, the averaging functions K$_v$ are directional averaging functions along a direction v=(dx, dt). An example is the function:

$$K_v(x, t)=K_1(t) \times K_2(x-t.dx/dt)$$

where K$_1$ and K$_2$ are 1D and 2D averaging kernels, for example Gaussian.

In another embodiment, the video processing performed in the processing unit 103 receives a variable number of directions from the direction detection unit 102. Each of these directions can be accompanied with a relevance measure. In the case where the number of directions is 0, a fallback interpolation function or averaging function can be used. In the case where the number of directions is larger than 1, the target pixel value can be computed by combining the pixel values computed with each interpolating or averaging function corresponding to each direction. This combination can be an averaging, a weighted averaging using the relevance measure, or a median, or a weighted median, or any other kind of method to combine these pixel values.

In another exemplary embodiment, the noise reduction processing along direction v=(dx, dt) can be any kind of known directional filtering, including infinite impulse response (IIR) filtering.

In another exemplary embodiment, the sparse geometry is used to enhance the type of processing disclosed in WO 2007/059795 A1 when the processed signal is a video signal. The directions (dx, dt) may then be limited to values of dt=1 and to integer values of dx. They can be used to construct a mapping between pixels of a frame at time t and pixels of a frame t+1: $(x,t) \mapsto (x+dx, t+1)$, and provide an embodiment for the first grouping estimation used in WO 2007/059795 A1.

In an embodiment of the direction selection unit 101, the set $\Omega$ of candidate directions is partitioned into a plurality of subsets $\Omega_1, \ldots, \Omega_J$ (J>1), and only one of the subsets $\Omega_1, \ldots, \Omega_J$ is considered by the direction selection unit 101 at each time $\tau'$ to provide candidates to enter the subset of selected directions $D_{\tau'}$. This is interesting when the set $\Omega$ is too large to be entirely scanned for candidates in every cycle $\tau'$. For example, at a time when subset $\Omega_j$ is considered ($1 \le j \le J$), loop 330 in FIG. 3 or 430 in FIG. 4 is carried out for the directions v that are in $\Omega_j$ but not in D.

In certain cases, it may be interesting, in addition to the selection of a global subset $D_{\tau'}$ for the whole image area, to split the image support into several windows $W_{p,q}$ of pixels, for example defined as rectangular regions:

$$W_{p,q} = \{(x_1, x_2): w \times (p-1) < x_1 \le w \times p \text{ and } h \times (q-1) < x_2 \le h \times q\}$$

where h and w are respectively the height and the width (in pixels) of these windows, and the window indexes p, q are in the ranges $1 \le p \le P$, $1 \le q \le Q$. The total number of windows is P×Q. When P=Q=1, there is only one window consisting of the whole image area as described previously. For each direction v inside each window $W_{p,q}$, a margin $m_{p,q}(v|D)$ can be computed using a formula similar to (4), but with a sum spanning an image region limited to this window $W_{p,q}$:

$$m_{p,q}(v|D) = \sum_{x \in W_{p,q}} m_x(v|D) \quad (10)$$

Local subset of directions $D_{\tau',p,q} \subset D_{\tau'}$ can be computed using these margins. A third subset $D_{\tau',p,q}$ of candidate directions is thus determined as a subset of the second subset $D_{\tau'}$ determined for the whole area of $I_{t+1}$, based on cost margins $m_{p,q}(v|D)$ computed for pixels of the window $W_{p,q}$ in the input images $I_t$ and $I_{t+1}$. When the direction detection unit 102 measures a direction at a pixel $\xi = x$ which is inside one of the windows $W_{p,q}$, only candidate directions from $D_{\tau',p,q}$ are taken into account. This is helpful to increase the robustness of the detection to avoid bad directions. Referring again to the example depicted in FIGS. 7-12, the selection allows to eliminate a bad direction (−1, 0, ½) [or (−2, 0, 1)] and to only use the right direction (−5, 0, ½) [or (−10, 0, 1)]. If the scene is more complex and somewhere else in the picture an object happens to be exhibiting a direction of regularity (−1, 0, ½), this vector (−1, 0, ½) will be present in $D_{\tau'}$, and the benefit of the selection made in unit 101 may be lost to properly handle the scrolling text. If the selection margins are recomputed on smaller windows $W_{p,q}$, the probability that such a window $W_{p,q}$ includes both the scrolling text and the object having the single direction of regularity (−1, 0, ½) will be much lower.

When using too small windows $W_{p,q}$ (e.g., in the case of FIGS. 7-12 a region spanning only one or two "e"s), the selection may become difficult because on too small windows, it is not possible any more to discriminate between two different directions of regularity. A multiscale selection scheme can be devised to avoid this difficulty, by recursively splitting the image support into windows, and each window into sub-windows. For each window, the subset of directions is selected as a subset of the subset of directions that was selected for the parent region (whole image or higher-layer window). In the multiscale selection scheme, one or more of the windows $W_{p,q}$ is further split into a plurality of sub-windows $W_{p,q,r,s}$, and for each sub-window a fourth subset $D_{\tau',p,q,r,s}$ of candidate directions is determined as a subset of the third subset $D_{\tau',p,q}$ determined for the window $W_{p,q}$, based on cost margins $m_{p,q,r,s}(v|D)$ computed for pixels of sub-window $W_{p,q,r,s}$ in the input images $I_t$ and $I_{t+1}$:

$$m_{p,q,r,s}(v|D) = \sum_{x \in W_{p,q,r,s}} m_x(v|D) \quad (11)$$

The directions of regularity for pixels of sub-window $W_{p,q,r,s}$ of the output image $I_{\tau'}$ are then detected from subset $D_{\tau',p,q,r,s}$, possibly after one or more iterations of the recursive splitting of the windows.

In some embodiments, the subset $D_{\tau'}$ of selected directions can be constrained to satisfy various criteria. For example:
  some particular directions (such as (0, 0, 1) typically) can be forced to permanently stay within $D_{\tau'}$, regardless of the margin associated with these directions;
  the set of directions $\Omega$ can also be split into R clusters $\Omega^{(1)}, \ldots, \Omega^{(R)}$, and a constraint can be enforced that for each cluster $\Omega^{(r)}$ ($1 \le r \le R$, R>1), only one or a limited number of directions is selected to be included into subset $D_{\tau'}$.

Figure 13:
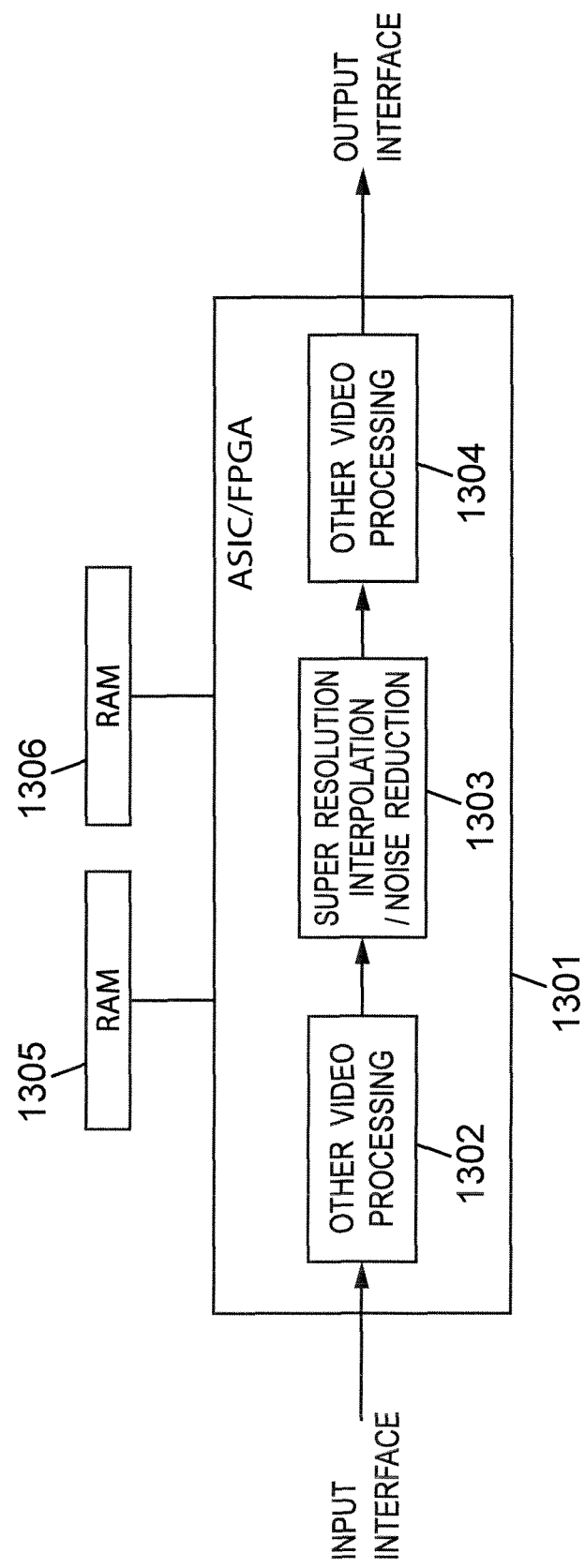
FIG. 13 is a block diagram of a video processing apparatus according to an embodiment of the invention.

The above-described embodiments may be implemented by means of software run by general-purpose microprocessors or digital signal processors, in which case the modules described above with reference to FIGS. 1-6 are understood to be or form part of software modules or routines. It may also be implemented as a hardware component as illustrated in FIG. 13, for example in an application-specific integrated circuit (ASIC) or field-programmable gate array (FPGA) for interpolating a video stream, in addition to other video processing blocks 1302, 1304, before and/or after the video interpolation block 1303. Alternatively, the video processing block 1303 may implement a noise reduction method as described above. In an exemplary embodiment, the video processing blocks 1302, 1303, 1304 are implemented in a single chip 1301. The chip also has video input and output interfaces, and external RAM (random access memory) devices 1305 and 1306 as temporary storage required for the different video processing steps performed in 1302, 1303 and 1304. Other variants of this embodiment can be equally considered as part of the invention, with more complete video processing chips, or even system-on-chip devices including other functionalities. The hardware device can then be incorporated into various kinds of video apparatus.

While a detailed description of exemplary embodiments of the invention has been given above, various alternative, modifications, and equivalents will be apparent to those skilled in the art. Therefore the above description should not be taken as limiting the scope of the invention which is defined by the appended claims.

The invention claimed is:
1. A method of analyzing an input video sequence to associate pixels of synthesized images of an output video sequence with respective directions of regularity belonging to a predefined set of directions, the method comprising:

determining, from the predefined set of directions, a first subset of candidate directions for a region of a first image of the output video sequence;

determining, from the predefined set of directions, a second subset of candidate directions for a corresponding region of a second synthesized image of the output video sequence following the first image, based on images of the input video sequence and the first subset of candidate directions;

wherein determining the second subset of candidate directions includes, evaluating a first margin for a first direction of the first subset, the first margin equal to a contribution of the first direction to a reduction of a cost function associated with the first subset, evaluating a second margin for a second direction of the predefined set of directions, the second margin equal to a decrement of the cost function associated with the first subset resulting from addition of the second direction to the first subset, and substituting the second direction for the first direction responsive to the second margin exceeding the first margin; and detecting the respective directions of regularity for pixels of said region of the second synthesized image from the second subset of candidate directions.

2. The method as claimed in claim 1, wherein determining the second subset of candidate directions further includes:

detecting at least one pair of directions $v_r$ and $v_a$ such that $v_r$ belongs to the first subset of candidate directions, $v_a$ belongs to the predefined set of directions but not to the first subset, and the cost function associated with the first subset with respect to said regions of the first and second images is higher than the cost function associated with a modified subset including $v_a$ and the directions of the first subset other than $v_r$; and in response to the detection, excluding $v_r$ from the second subset and including $v_a$ into the second subset.

3. The method as claimed in claim 1, wherein the second margin for a direction of the predefined set is estimated as a sum of local margins over the pixels of said regions, whereby a local margin for a pixel x and a direction v is:

$L_x(D) - L_x(v)$ if v is the best direction in the whole predefined set from the point of view of minimizing a local cost at pixel position x, where $L_x(v)$ designates the local cost at pixel position x for direction v and $L_x(D)$ designates a minimum value of the local cost at pixel position x for the directions of the first subset; and zero else.

4. The method as claimed in claim 1, wherein determining the second subset of candidate directions further includes:

selecting a third direction having the lowest first margin in the first subset;

selecting a fourth direction having the highest second margin in the predefined set other than the first subset; and if the second margin for the selected second direction is above the first margin for the selected first direction, excluding the selected first direction from the second subset and including the selected second direction into the second subset.

5. The method as claimed in claim 1, comprising wherein determining the second subset of candidate directions further includes:

selecting and sorting with increasing margins a number n of directions $v_1, v_2, \ldots, v_n$ having lowest first margins in the first subset;

selecting and sorting with decreasing margins the n directions $w_1, w_2, \ldots, w_n$ having highest second margins in the predefined set other than the first subset; and for each direction $w_i$ of the n sorted directions $w_1, w_2, \ldots, w_n$ of the predefined set other than the first subset, with $1 \leq i \leq n$, if the second margin is above the first margin for the corresponding direction $v_i$ of the n sorted directions $v_1, v_2, \ldots, v_n$ of the predefined set other than the first subset, excluding $v_i$ from the second subset and including $w_i$ into the second subset.

6. The method as claimed in claim 1, wherein determining the second subset of candidate directions further includes excluding from the second subset directions of the predefined set having an evaluated margin below a preset threshold.

7. The method as claimed in claim 1, wherein the cost function associated with a given subset of directions is a sum, over the pixels of said regions, of minimum values of local costs for the different directions of the given subset.

8. The method as claimed in claim 1, wherein the cost function associated with a given subset of directions is a sum, over the pixels of said regions, of minimum values of local costs for the different directions of the given subset.

9. The method as claimed in claim 1, wherein determining the second subset of candidate directions further includes estimating local cost functions between at least two successive images of the input video sequence having respective time positions before and after said second synthesized image of the output video sequence.

10. The method as claimed in claim 1, wherein at least one preset direction is forced to be included into the first and second subsets.

11. The method as claimed in claim 1, wherein the predefined set of directions is partitioned into a plurality of clusters, and in the determination of the second subset of candidate directions, one or a limited number of directions of each cluster is selected to be included into said second subset.

12. The method as claimed in claim 1, wherein the images of the video sequences are split into a plurality of windows, wherein the second subset of candidate directions is determined for a region corresponding to the whole area of the second synthesized image, the method further comprising, for each window:

determining a third subset of candidate directions as a subset of said second subset, based on cost margins determined for pixels of said window; and detecting the directions of regularity for pixels of said window of the second synthesized image from the third subset of candidate directions.

13. The method as claimed in claim 12, wherein at least one of the windows is further split into a plurality of sub-windows, the method further comprising, for each sub-window of said window:

determining a fourth subset of candidate directions as a subset of the third subset determined for said window, based on cost margins determined for pixels of said sub-window; and detecting the directions of regularity for pixels of said sub-window of the second synthesized image from the fourth subset of candidate directions.

14. The method as claimed in claim 1, wherein detecting the directions from the second subset further includes estimating local cost functions between the at least two successive images of the input video sequence having respective time positions before and after said second synthesized image of the output video sequence.

15. A video processing device, comprising computing circuitry arranged to analyze an input video sequence to associate pixels of synthesized images of an output video sequence with respective directions of regularity belonging to a predefined set of directions, wherein the analysis of the input video sequence comprises:

determining, from the predefined set of directions, a first subset of candidate directions for a region of a first image of the output video sequence;

determining, from the predefined set of directions, a second subset of candidate directions for a corresponding region of a second synthesized image of the output video sequence following the first image, based on images of the input video sequence and the first subset of candidate directions;

wherein determining the second subset of candidate directions includes, evaluating a first margin for a first direction of the first subset, the first margin equal to a contribution of the first direction to a reduction of a cost function associated with the first subset, evaluating a second margin for a second direction of the predefined set of directions, the second margin equal to a decrement of the cost function associated with the first subset resulting from addition of the second direction to the first subset, and substituting the second direction for the first direction responsive to the second margin exceeding the first margin; and detecting the respective directions of regularity for pixels of said region of the second synthesized image from the second subset of candidate directions.

16. A non-transitory computer-readable medium having a program stored therein, wherein said program comprises instructions to analyze an input video sequence when said program is run in a computer processing unit, to associate pixels of synthesized images of an output video sequence with respective directions of regularity belonging to a predefined set of directions, wherein the analysis of the input video sequence comprises:

determining, from the predefined set of directions, a first subset of candidate directions for a region of a first image of the output video sequence;

determining, from the predefined set of directions, a second subset of candidate directions for a corresponding region of a second synthesized image of the output video sequence following the first image, based on images of the input video sequence and the first subset of candidate directions;

wherein determining the second subset of candidate directions includes, evaluating a first margin for a first direction of the first subset, the first margin equal to a contribution of the first direction to a reduction of a cost function associated with the first subset, evaluating a second margin for a second direction of the predefined set of directions, the second margin equal to a decrement of the cost function associated with the first subset resulting from addition of the second direction to the first subset, and substituting the second direction for the first direction responsive to the second margin exceeding the first margin; and detecting the respective directions of regularity for pixels of said region of the second synthesized image from the second subset of candidate directions.

17. A video processing method, comprising:

receiving successive images of an input video sequence;

analyzing the input video sequence to associate pixels of synthesized images of an output video sequence with respective directions of regularity; and generating the output video sequence from the input video sequence using the detected directions of regularity, wherein analyzing the input video sequence comprises:

determining, from the predefined set of directions, a first subset of candidate directions for a region of a first image of the output video sequence;

determining, from the predefined set of directions, a second subset of candidate directions for a corresponding region of a second synthesized image of the output video sequence following the first image, based on images of the input video sequence and the first subset of candidate directions;

wherein determining the second subset of candidate directions includes, evaluating a first margin for a first direction of the first subset, the first margin equal to a contribution of the first direction to a reduction of a cost function associated with the first subset, evaluating a second margin for a second direction of the predefined set of directions, the second margin equal to a decrement of the cost function associated with the first subset resulting from addition of the second direction to the first subset, and substituting the second direction for the first direction responsive to the second margin exceeding the first margin; and detecting the respective directions of regularity for pixels of said region of the second synthesized image from the second subset of candidate directions.

18. The method as claimed in claim 17, wherein generating the output video sequence comprises performing interpolation between successive images of the input video sequence using the detected directions of regularity.

19. The method as claimed in claim 18, wherein the interpolation comprises video deinterlacing.

20. The method as claimed in claim 18, wherein the interpolation comprises converting the frame rate of the input video sequence.

21. The method as claimed in claim 17, wherein the step of generating the output video sequence comprises applying a noise reduction operation to the input video sequence using the detected directions of regularity.

22. A video processing apparatus, comprising computing circuitry for:

receiving successive images of an input video sequence;

analyzing the input video sequence to associate pixels of synthesized images of an output video sequence with respective directions of regularity; and generating the output video sequence from the input video sequence using the detected directions of regularity;

wherein the analysis of the input video sequence comprises:

determining, from the predefined set of directions, a first subset of candidate directions for a region of a first image of the output video sequence;

determining, from the predefined set of directions, a second subset of candidate directions for a corresponding region of a second synthesized image of the output video sequence following the first image, based on images of the input video sequence and the first subset of candidate directions;

wherein determining the second subset of candidate directions includes, evaluating a first margin for a first direction of the first subset, the first margin equal to a contribution of the first direction to a reduction of a cost function associated with the first subset, evaluating a second margin for a second direction of the predefined set of directions, the second margin equal to a decrement of the cost function associated with the first subset resulting from addition of the second direction to the first subset, and substituting the second direction for the first direction responsive to the second margin exceeding the first margin; and detecting the respective directions of regularity for pixels of said region of the second synthesized image from the second subset of candidate directions.

* * * * *

UNITED STATES PATENT AND TRADEMARK OFFICE
CERTIFICATE OF CORRECTION

PATENT NO. : 8,571,114 B2
APPLICATION NO. : 12/812201
DATED : October 29, 2013
INVENTOR(S) : Joan Bruna Estrach et al.

It is certified that error appears in the above-identified patent and that said Letters Patent is hereby corrected as shown below:

In the Specification:

In Column 7, Line 36, delete " $t'=\tau+\delta\tau$ " and insert -- $\tau'=\tau+\delta\tau$ --, therefor.

In Column 8, Line 20, delete "Units unit 102 and unit 103" and insert -- Units 102 and 103 --, therefor.

In Column 13, Line 35, delete "≥m(w)." and insert -- ≥m($w_n$). --, therefor.

In Column 13, Line 38, delete "m($w_1$)" and insert -- m($w_i$) --, therefor.

In Column 15, Line 9, delete "units unit 101 and unit 102" and insert -- units 101 and 102 --, therefor.

Signed and Sealed this
Fourteenth Day of January, 2014

Michelle K. Lee
*Deputy Director of the United States Patent and Trademark Office*